United States Patent [19]
Klingelhoefer et al.

[11] 3,723,606
[45] Mar. 27, 1973

[54] PRODUCTION OF PHOSPHORIC ACID

[75] Inventors: William Christian Klingelhoefer, Hopewell; James Earl Sansing, Jr., Chester, both of Ill.

[73] Assignee: Allied Chemical Corporation, New York, N.Y.

[22] Filed: Dec. 21, 1970

[21] Appl. No.: 100,367

Related U.S. Application Data

[63] Continuation-in-part of Ser. No. 716,788, March 28, 1968, abandoned.

[52] U.S. Cl. ............................... 423/321, 23/312 D
[51] Int. Cl. ............................................. C01b 25/16
[58] Field of Search ...... 23/165, 165 B, 165 C, 312 D

[56] References Cited

UNITED STATES PATENTS

| | | | |
|---|---|---|---|
| 3,311,450 | 3/1967 | Alon et al. | 23/165 |
| 3,397,955 | 8/1968 | Champ et al. | 23/165 |
| 2,880,063 | 3/1959 | Baniel et al. | 23/165 |
| 2,954,287 | 9/1960 | Carothers et al. | 71/40 |
| 3,375,068 | 3/1968 | Frohlich et al. | 23/165 |
| 3,410,656 | 11/1968 | Bunin et al. | 23/165 |

Primary Examiner—Earl C. Thomas
Assistant Examiner—Gregory A. Heller
Attorney—Fred L. Kelly and Patrick L. Henry

[57] ABSTRACT

Phosphate rock is reacted with hydrochloric acid in the presence of a water-soluble sodium compound to produce an aqueous acidulate containing phosphoric acid. The aqueous acidulate is extracted with a homogeneous organic liquid extractant comprising a liquid hydrocarbon and a low molecular weight, acidulate-immiscible alcohol to produce an organic solution of phosphoric acid. The organic solution of phosphoric acid is extracted with water and the resulting extract is concentrated to produce phosphoric acid which is low in calcium chloride content. Preferably, the organic solution of phosphoric acid is purified by extraction with aqueous phosphoric acid to remove calcium prior to extraction with water. The product phosphoric acid contains only 0.05–0.5 part by weight of calcium per 100 parts by weight of phosphoric acid, measured as $P_2O_5$, and is particularly useful in production of stable fertilizer solutions.

1 Claim, 2 Drawing Figures

FIG.I.

PRODUCTION OF PHOSPHORIC ACID

REFERENCE TO RELATED APPLICATIONS

This application is a continuation-in-part of our copending application Ser. No. 716,788, filed Mar. 28, 1968 and now abandoned.

BACKGROUND OF THE INVENTION

This invention relates to the production of orthophosphoric acid (hereinafter referred to as "phosphoric acid"). More particularly, the invention relates to the production of phosphoric acid by the reaction of phosphate rock with hydrochloric acid and extraction of the resulting aqueous acidulate. The phosphoric acid produced in accordance with the present invention has low calcium salt content, particularly calcium chloride content.

It is known to produce and isolate phosphoric acid by acidulation of phosphate rock with sulfuric acid followed by extraction of the resulting aqueous acidulate with certain polar organic liquids (e.g., low molecular weight alcohols) which are capable of dissolving phosphoric acid. It is also known to use hydrochloric acid as an attractive alternative to sulfuric acid in the acidulation step. However, when hydrochloric acid is used, the calcium chloride by-product is extracted from the aqueous acidulate in substantial quantities along with the phosphoric acid by the polar organic liquid extractant. As a consequence, the phosphoric acid obtained as a final product is contaminated with substantial quantities of calcium chloride. Important applications of phosphoric acid exist, e.g., in the fertilizer and detergent arts, which require that the phosphoric acid used has a low calcium chloride content. Phosphoric acid is especially preferred for use in the fertilizer and detergent arts when said acid contains no more than about 1 part, desirably 0.05 to 0.5 part by weight of calcium per 100 parts by weight of phosphoric acid expressed in terms of phosphorus pentoxide.

Accordingly, it is an object of the present invention to provide a process for producing phosphoric acid by the reaction of hydrochloric acid with phosphate rock, followed by isolation of phosphoric acid from the resulting aqueous acidulate, which phosphoric acid has a low content of calcium salts, particularly calcium chloride.

Another object is to provide an improvement in the production of phosphoric acid from phosphate rock, which improvement permits the production of phosphoric acid which has a low content of calcium salts, particularly calcium chloride.

Other objects and a fuller understanding of the present invention can be had by reference to the following detailed description and claims.

SUMMARY OF THE INVENTION

In accordance with the present invention, phosphate rock is reacted or "acidulated" with hydrochloric acid to form an aqueous solution (hereinafter referred to as "aqueous acidulate" or "acidulate") containing principally phosphoric acid and calcium chloride. It is a feature of the present invention that the acidulation is preferably conducted in the presence of a water-soluble sodium compound. Concomitant with the formation of the aqueous acidulate there is formed a by-product composed, inter alia, of siliceous material which is essentially insoluble in the aqueous acidulate. The aqueous acidulate is extracted with a homogeneous, water-immiscible solvent (hereinafter referred to as "organic liquid extractant") comprising a normally liquid hydrocarbon and a low molecular weight, acidulate-immiscible alcohol or mixture thereof. Preferably, the above-mentioned alcohol constitutes between about 65 percent by volume and about 90 percent by volume of the organic liquid extractant. The remainder of the organic liquid extractant is composed essentially of liquid hydrocarbon. In this manner, an organic solution of phosphoric acid is formed as a liquid phase which separates from the now phosphoric acid-free aqueous acidulate (hereinafter referred to as "aqueous raffinate"). This organic solution of phosphoric acid is in turn extracted with water to produce an aqueous solution of phosphoric acid, which solution can be concentrated with respect to phosphoric acid by conventional removal of water.

DESCRIPTION OF THE INVENTION

The present invention is based upon the discovery that when the organic liquid extractant is formulated to contain a liquid hydrocarbon and a low molecular-weight, acidulate-immiscible alcohol (e.g., isobutyl alcohol, isoamyl alcohol, and the like), the solubility of calcium chloride in the formulation is unexpectedly decreased to a much greater extent than the solubility therein of phosphoric acid. For example, isobutyl alcohol per se extracts about 1 part by weight calcium per 30 parts by weight $P_2O_5$; isoamyl alcohol per se extracts about 1 part by weight calcium per 50 parts by weight $P_2O_5$. However, a mixture of 75 percent by volume of isobutyl alcohol and 25 percent by volume of a liquid hydrocarbon (e.g., n-heptane, toluene, kerosene, and the like) extracts about 1 part by weight calcium per 120 parts by weight $P_2O_5$; a mixture of 67 percent by volume of isobutyl alcohol and 33 percent by volume of liquid hydrocarbon extracts about 1 part by weight calcium per 140 parts by weight $P_2O_5$. In other words, the incorporation of a liquid hydrocarbon into the extractant increases the selectivity thereof toward phosphoric acid. As a result of this hitherto unappreciated phenomenon, when an organic liquid extractant according to the present invention is employed in lieu of the low molecular weight, acidulate-immiscible alcohol per se for purposes of extracting phosphoric acid from the aqueous acidulate, the phosphoric acid so extracted can be obtained without substantial contamination thereof with calcium chloride. Rather, the calcium chloride generally remains in solution within the aqueous raffinate.

The present invention is also based upon the further discovery that, whereas low molecular weight, acidulate-immiscible alcohols suffer a decrease in extraction efficiency as the phosphoric acid concentration of the acidulate decreases, mixtures of liquid hydrocarbon and said alcohols on the other hand show only a relatively slight decrease in phosphoric acid extraction efficiency. This unexpected dichotomy between the countercurrent 25° C. extraction power of low molecular weight, acidulate-immiscible alcohols and the extraction power of mixtures thereof with liquid hydrocarbons is exploited in the present invention by using countercurrent extraction as the preferred mode of extracting the aqueous acidulate with organic liquid extractant. In this connection, it is a feature of the present invention that an increase in the number of stages of the countercurrent extraction results in an increase in the selectivity of the organic liquid extractant toward phosphoric acid. Accordingly, the purity (relative to calcium salts) of the phosphoric acid produced in accordance with the present invention increases with increasing number of stages in the countercurrent extraction. In particular, if the aqueous acidulate is extracted with organic liquid extractant in a countercurrent extraction set-up having at least about nine stages, the resulting organic solution of phosphoric acid generally contains about 1 part by weight of calcium per 100 parts by weight phosphorus pentoxide. Phosphoric acid of such high purity with regard to calcium salts is particularly useful in the manufacture of fertilizers and detergents.

The present invention has been described above in terms of phosphate rock as the starting material. However, to the present process (which can be conducted in either a batchwise or continuous manner) is applicable to other materials (e.g., phosphatic chalk, guano, bone, and the like) which contain substantial amounts of calcium phosphates, particularly tricalcium phosphate $Ca_3(PO_4)_2$. In view of the natural abundance of phosphate rock and the wide geographical distribution thereof, the present invention will be described in terms of phosphate rock as the preferred starting material.

The step of acidulating phosphate rock with hydrochloric acid is generally conducted using minimum amounts of water to ensure a relatively high concentration of phosphoric acid in the aqueous acidulate. Preferably, concentrated hydrochloric acid (i.e., 37–38 percent by weight aqueous HCl is employed. Alternatively, the acidulation step can be conducted by contacting an aqueous slurry of phosphate rock with vapor-phase hydrogen chloride. In this connection, it is noted that the use of gaseous hydrogen chloride permits the controlled addition thereof to the aqueous slurry. As a result, foaming of the acidulation reaction mixture can be minimized. Furthermore, the acidulation step is preferably conducted in the presence of a reactive excess of hydrochloric acid; a hydrochloric acid equivalent excess of between about 3% and about 20% is especially preferred. Under these conditions the insoluble by-product contains negligible amounts of unreacted phosphate.

Phosphate rock suitable for use in the present process can be of any form heretofore employed in the acidulation art, although the efficiency and rate of the acidulation generally increase as the average particle size of the phosphate rock decreases. Accordingly, it is preferred to use phosphate rock in finely comminuted form.

The reaction of hydrochloric acid with phosphate rock proceeds rapidly at ambient temperature. Preferably, however, a temperature of between about 100° C. and about 115° C. is employed, whereupon the reaction is generally completed in about 1–15 minutes.

During the acidulation of phosphate rock (which contains substantial quantities of fluorapatite, $Ca_3(PO_4)B2 \cdot CaF_2$), hydrogen fluoride is formed which causes silicates present in the phosphate rock to dissolve in the aqueous acidulate. This "soluble silica," unless removed, causes severe emulsion problems during the extraction stages of the present process. The addition of alkali metal ion, particularly sodium ion, during the acidulation step causes precipitation of a major part of the soluble silica. Accordingly, a water-soluble sodium compound, e.g., sodium chloride, sodium nitrate, sodium phosphate, sodium sulfate, sodium carbonate, and the like, is employed as the source of sodium ion. Desirably, between about 3 parts by weight and about 10 parts by weight of sodium compound, preferably sodium chloride, are incorporated with each 100 parts by weight of phosphate rock in the acidulation step. The addition of at least about 3 parts by weight of sodium chloride per 100 parts by weight of phosphate rock during the acidulation according to the present invention affords an aqueous acidulate containing no more than about 0.1 percent by weight of dissolved silica (expressed in terms of $SiO_2$). The use of larger quantities of sodium chloride results in a correspondingly lower concentration of dissolved silica in the aqueous acidulate. Insolubles can be removed from the aqueous acidulate by conventional means, e.g., decantation, filtration, centrifugation, and the like. It is also advantageous to treat the acidulate with settling agents to hasten the separation of insolubles. The aqueous acidulate so obtained is a generally clear solution of phosphoric acid and calcium chloride, the concentration of which depends on the volume of water employed in the acidulation step. Ordinarily, the aqueous acidulate contains about 5–15 percent by weight of phosphorus pentoxide and about 20–40 percent by weight of calcium chloride. In addition, the aqueous acidulate can contain smaller amounts of hydrochloric acid and dissolved compounds of iron, aluminum, magnesium, silicon, and fluorine.

The aqueous acidulate is then extracted with an organic liquid extractant in the manner described hereinbelow. Prior to said extraction, the water content of the acidulate can be adjusted so that precipitation of salts will not occur under conditions of extraction. Generally, the water content is adjusted according to the temperature of the extraction operation, a lower extraction temperature requiring a higher acidulate water content, and vice versa. From the standpoint of economy, it is desirable to conduct the extraction of the acidulate with as high a phosphoric acid concentration therein as possible.

The organic liquid extractant according to the present invention is a homogeneous mixture of a liquid hydrocarbon and a low molecular-weight, acidulate-immiscible alcohol. The organic liquid extractant is, of course, immiscible with water, but nevertheless capable of dissolving phosphoric acid in substantial amounts.

Low molecular weight, acidulate-immiscible alcohols suitable for formulating the organic liquid extractant of the present invention include all those capable of dissolving phosphoric acid and which are also capable of forming homogeneous solutions with liquid hydrocarbons. Such alcohols generally contain between about four carbon atoms per molecule and about eight carbon atoms per molecule, viz., butanols, pentanols, hexanols, heptanols, and octanols. Illustrative of each of the above groups of alcohols are the following:

Butanols
  n-butyl alcohol
  iso-butyl alcohol
  sec-butyl alcohol
  tert-butyl alcohol
Pentanols
  n-amyl alcohol
  iso-amyl alcohol (i.e., 3-methyl-1-butanol)
  tert-amyl alcohol
  neo-amyl alcohol
  cyclopentanol
Hexanols
  n-hexyl alcohol
  cyclohexanol
Heptanols
  n-heptyl alcohol
  cycloheptanol
Octanols
  n-octyl alcohol Butanols and pentanols are the preferred groups of alcohols for use in the present invention, with n-butyl alcohol, iso-butyl alcohol and iso-amyl alcohol being especially preferred.

Liquid hydrocarbons suitable for formulating the organic liquid extractant of the present invention include all those capable of forming solutions with the above-mentioned low molecular weight, acidulate-immiscible alcohols. Such liquid hydrocarbons include aliphatic hydrocarbons (including saturated and unsaturated hydrocarbons), carbocyclic hydrocarbons (including alicyclic and aromatic hydrocarbons), and mixtures thereof (e.g., turpentine, kerosene, gasoline, and the like). Illustrative of each of the above groups of liquid hydrocarbons are the following:

Aliphatic Hydrocarbons
  n-hexane and hexane isomers
  1-,2-, and 3-hexenes
  n-heptane and heptane isomers
  n-octane and octane isomers, especially iso-octane (i.e., 2,2,4-trimethylpentane)
Carbocyclic Hydrocarbons
  (a) Alicyclic Hydrocarbons
    cyclohexane
    cyclohexene
    cycloheptane
    cyclooctane
    decalin
  (b) Aromatic Hydrocarbons
    benzene
    toluene
    o-, m-, and p-xylenes
    ethylbenzene
    2-methylnaphthalene Liquid hydrocarbons which are especially preferred for use in the present invention include hexanes, heptanes, benzene, toluene, ethylbenzene, and xylenes.

Preferred organic liquid extractants according to the present invention are formulated to contain between about 65 percent by volume and about 90 percent by volume of low-molecular weight, water-immiscible alcohol and, correspondingly, between about 10 percent by volume and about 35 percent by volume of liquid hydrocarbon. Especially preferred organic liquid extractants are formulated to contain between about 75 percent by volume and about 85 percent by volume of alcohol and, correspondingly, between about 15 percent by volume and about 25 percent by volume of hydrocarbon.

In producing phosphoric acid according to the present process, it is advantageous to saturate the organic liquid extractant with water prior to using said extractant in order to minimize volume losses from the aqueous acidulate during the extraction thereof.

The acidulate can be extracted with an organic liquid extractant in any manner conventional to the liquid-liquid extraction art. However, from the standpoint of achieving maximum extraction efficiency (i.e., extracting a maximum amount of phosphoric acid with a minimum amount of extractant), and product purity, it is preferred to conduct the extraction steps of the present process using multistage countercurrent extraction set-ups. In preferred embodiments of the present invention, the extraction of aqueous acidulate with organic liquid extractant and the subsequent extraction of the resulting organic solution of phosphoric acid with water are conducted in multistage countercurrent extraction set-ups of at least about nine stages each. A particularly preferred mode of carrying out the extraction steps of the present process involves use of an extraction set-up as described hereinafter in connection with FIG. 2. Such an extraction set-up permits the more complete extraction of phosphoric acid, the greater the number of extraction stages employed therein. Preferably, the extraction set-up according to the present invention contains between about 20 and about 40 stages. Especially preferred is an extraction set-up containing between about 25 and about 30 extraction stages. Between about 3 parts by volume and about 20 parts by volume of the organic liquid extractant are used per part by volume of aqueous acidulate extracted therewith. Extraction set-ups involving more than about 40 stages are, of course, suitable for use in the present invention. However, such set-ups do not offer any particular advantage over set-ups containing between about 25 and about 40 stages.

It is preferred to conduct the extraction of aqueous acidulate with organic liquid extractant at a uniform temperature of between about 25° C. and about 90° C., and particularly at a temperature of between about 40° C. and about 80° C. It is also preferred to conduct the extraction in the presence of strong acid to avoid the precipitation of insoluble phosphates in the extraction set-up. Volatile mineral acid, especially hydrochloric acid, is preferred for such purpose due to the ease of removal thereof from the phosphoric acid product by evaporative means. Generally, the weight ratio of HCl added to the acidulate feed to $P_2O_5$ present therein is preferably maintained at least as high as about 0.9.

In a typical preferred multistage countercurrent extraction procedure, the organic liquid extractant of the present invention is introduced at one end of the set-up and aqueous raffinate is withdrawn at this stage. Mineral acid, preferably hydrochloric acid (concentrated hydrochloric acid is especially preferred) is introduced at one or more stages between the acidulate feed point and the organic liquid extractant feed point. Aqueous acidulate is introduced at a stage near the middle of the extraction set-up and aqueous phosphoric acid (containing hydrochloric acid) is withdrawn at a point several stages beyond this aqueous acidulate feed point. The intervening extraction stages are used for extraction of calcium from the organic liquid extractant. Water for extraction of the organic solution of phosphoric acid is introduced at the last extraction stage and washed organic liquid extractant is withdrawn at this stage.

The aqueous phosphoric acid solution obtained contains typically about 12 percent by weight $P_2O_5$, 12 percent by weight HCl and less than 0.1 percent by weight calcium. This aqueous solution can be concentrated to any desired $P_2O_5$ content by conventional evaporation and distillation procedures. Water, HCl, and minor amounts or organic solvent are taken overhead and can be recovered and recycled. Generally, the aqueous phosphoric acid solution is concentrated to contain about 60 percent by weight $P_2O_5$.

BRIEF DESCRIPTION OF THE DRAWINGS

In the accompanying drawings.

DESCRIPTION OF THE PREFERRED EMBODIMENTS

Figure 1:
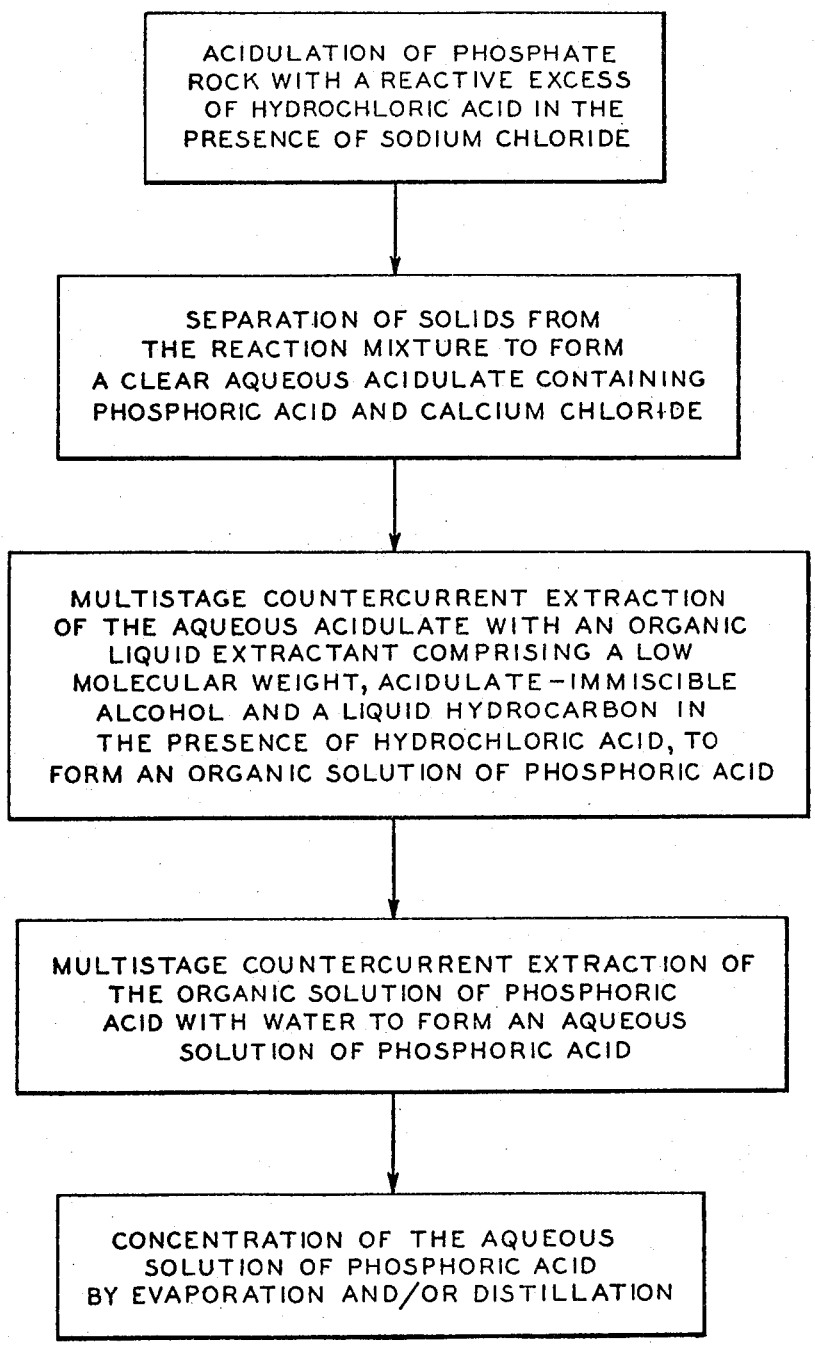
FIG. 1 is a diagrammatic flow sheet illustrating the process of the present invention in its broadest aspects.
Figure 2:
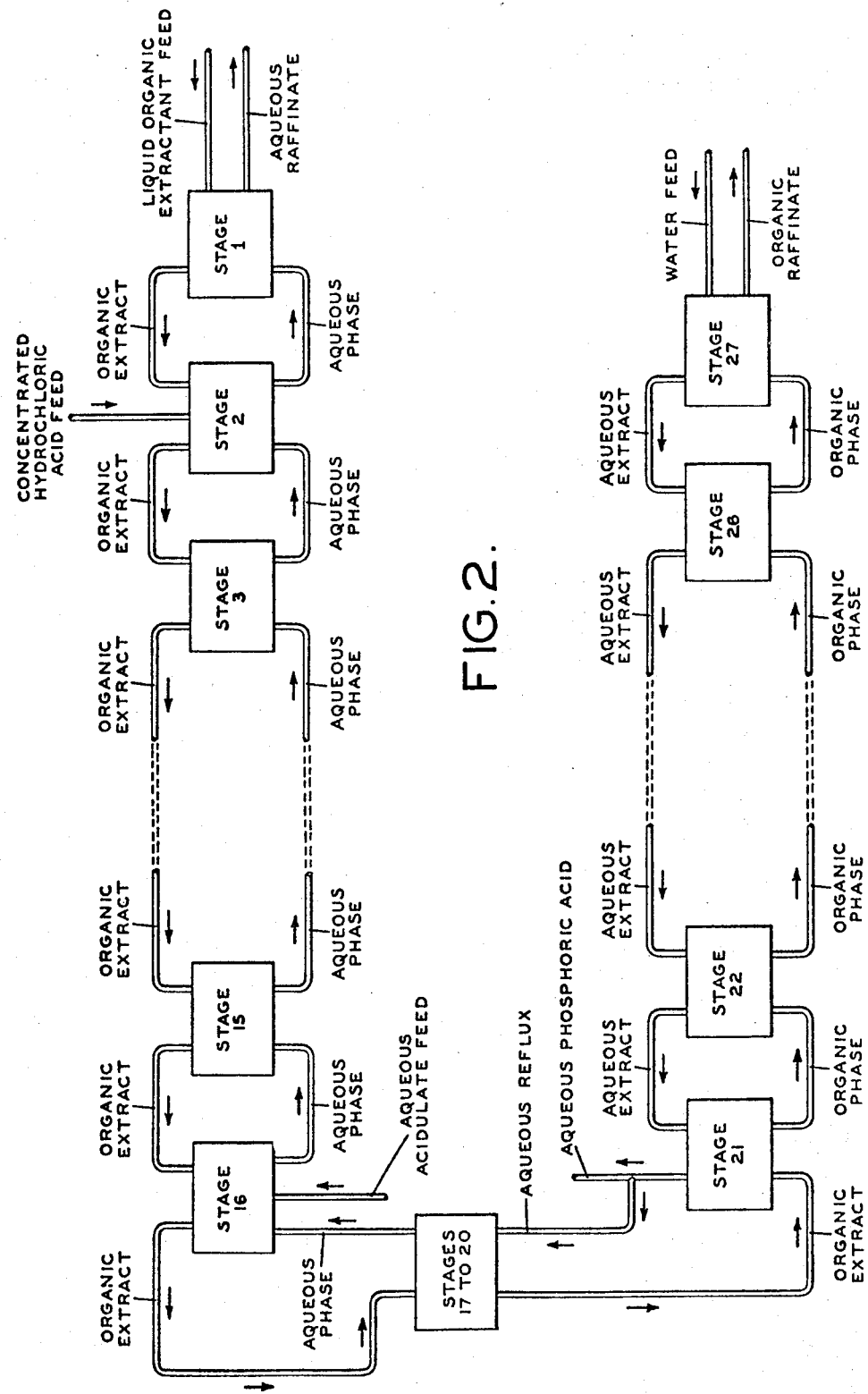
FIG. 2 is a schematic illustration of a preferred mode of carrying out the extraction steps of the present invention.

With reference to FIG. 2, each box represents an individual stage of a preferred multistage countercurrent extraction set-up. Organic liquid extractant is added at stage 1 of the extractor and aqueous raffinate is withdrawn at this point. Aqueous acidulate is added at stage 16. Concentrated hydrochloric acid is added at stage 2 to maintain high acidity during the extraction of the aqueous acidulate with the organic liquid extractant. Stages 17 through 20 are used for reflux, i.e., purification purposes. Aqueous phosphoric acid containing HCl is withdrawn at stage 21, while water for extraction of the organic solution of phosphoric acid is introduced at stage 27. Washed organic liquid extractant is withdrawn from stage 27.

An especially preferred process for the production of phosphoric acid low in calcium-chloride content comprises:

a. reacting phosphate rock with a reactive excess of hydrochloric acid in the presence of a water-soluble sodium compound to produce an aqueous acidulate containing phosphoric acid, calcium chloride, and insoluble siliceous material;

b. separating the insoluble siliceous material from the aqueous acidulate to form a clear aqueous acidulate containing phosphoric acid, calcium chloride and no more than 0.1 percent by weight of dissolved siliceous material, expressed as $SiO_2$;

c. extracting the clear aqueous acidulate with 3–5 parts by volume per part of acidulate, of a homogeneous, water-immiscible organic liquid extractant containing about 75 to 85 percent by volume of an alcohol selected from the group consisting of butyl alcohols and amyl alcohols, and about 25 to 15 percent by volume of a hydrocarbon selected from the group consisting of hexanes and heptanes, said extraction being conducted as a multistage countercurrent extraction of about nine to 16 stages at a temperature between about 25° C. and about 80° C., said extraction further being conducted in the presence of at least about 0.9 part by weight of added hydrochloric acid per part by weight of $P_2O_5$ in the acidulate feed, said hydrochloric acid being added at the organic liquid feed end of said multistage countercurrent extraction, to produce an organic solution of phosphoric acid containing hydrochloric acid and about 1–6 parts by weight of calcium per 100 parts by weight of phosphoric acid, measured as $P_2O_5$;

d. extracting the organic solution formed in step (c) with one-fifth to one-seventh part by volume per part of organic solution, of aqueous phosphoric acid recycled from step (e), said extraction being conducted as a multistage countercurrent extraction of two to nine stages at a temperature between about 25° and 80° C., to extract calcium from the organic solution and produce an organic solution of phosphoric acid containing hydrochloric acid and 0.05–0.5 part by weight of calcium per 100 parts by weight of phosphoric acid, measured as $P_2O_5$, and an aqueous phosphoric acid solution containing extracted calcium;

e. extracting the organic solution formed in step (d) with about one-third to one-fifth part by volume per part of organic solution, of water, said extraction being conducted as a multistage extraction of about seven to 14 stages at a temperature between about 25° and 80° C. to produce an aqueous solution of phosphoric acid containing hydrochloric acid and 0.05–0.5 part by weight of calcium per 100 parts by weight phosphoric acid, measured as $P_2O_5$;

f. recycling part of the aqueous solution of phosphoric acid formed in step (e) to step (d); and g. concentrating the residual aqueous solution of phosphoric acid from step (e) by evaporation to remove the hydrogen chloride and part of the water to form a concentrated aqueous phosphoric acid containing 0.05 – 0.5 part by weight of calcium per 100 parts by weight of phosphoric acid, measured as $P_2O_5$.

The aqueous phosphoric acid containing extracted calcium from step (d) is desirably fed to step (c) where it is commingled with the aqueous acidulate for recovery of the phosphoric acid content by the multistage countercurrent extraction with the organic liquid extractant.

In the following examples, parts and percentages are by weight unless otherwise indicated. Example I illustrates the application of the present process to aqueous acidulate formed by reacting phosphate rock with concentrated hydrochloric acid. Example II illustrates the selectivity of the organic liquid extractant of the present invention toward phosphoric acid. Example III illustrates the criticality of specific operating conditions in the multistage extraction portion of the overall process.

EXAMPLE I

One thousand parts of phosphate rock (through 30 U.S. mesh), analyzing 30.2% $P_2O_5$, 10.7% $SiO_2$, and 45.1% CaO, are mixed with 1,694 parts of concentrated hydrochloric acid, 465 parts of water, and 60 parts of sodium chloride. The mixture is heated with conventional agitation at 80°–100° C. for 15 minutes. Agitation is then discontinued and the solids are allowed to settle while maintaining the system at a temperature of about 85° C. The resulting hot, supernatant, aqueous acidulate is a clear solution of specific gravity 1.41 and analyzing 135 grams $P_2O_5$ per liter, 145 grams calcium ion per liter, and 279 grams of chloride ion per liter. The aqueous acidulate also analyzed 0.03% $SiO_2$. It is noted that, in runs identical to that described above but differing in that the sodium chloride is added after the acidulation and before extraction, the resulting aqueous acidulate analyzed 0.2–0.4% $SiO_2$. In further runs, it is found that other water-soluble sodium compounds, e.g., sodium phosphate, sodium nitrate, sodium carbonate, can be substituted for sodium chloride with equally good results.

The aqueous acidulate is next subjected to a multistage counter-current extraction with an organic liquid extractant, followed by a multistage counter-current extraction of the resulting organic solution of phosphoric acid with water in a multistage counter-current liquid-liquid extractor represented schematically in FIG. 2. The temperature at each stage of the extraction is maintained at between about 50° C. and about 60° C. by conventional means (not shown). Organic liquid extractant composed of 4 parts by volume isobutyl alcohol for each part by volume of n-heptane and saturated with water is introduced at stage 1 at the rate of about 20 parts by volume per hour; aqueous acidulate is introduced at stage 16 at the rate of about 5 parts by volume per hour; concentrated hydrochloric acid is introduced at stage 2 at the rate of about 1.2 parts by volume per hour; water is introduced at stage 27 at the rate of about 6 parts by volume per hour; and aqueous phosphoric acid analyzing 105 grams per liter $P_2O_5$, 117 grams per liter chloride ion, and 0.05 grams per liter calcium ion, is withdrawn at stage 21 at the rate of about 7.1 parts by volume per hour. Aqueous raffinate analyzing 1.4 grams per liter $P_2O_5$, 204 grams per liter chloride ion, and 114 grams per liter of calcium ion is withdrawn at stage 1 at the rate of about 6.7 parts by volume per hour.

The aqueous phosphoric acid withdrawn from stage 21 is concentrated to about 60% $P_2O_5$ content by evaporation, during which aqueous HCl is recovered by condensation of the overhead.

The phosphoric acid product contains about 0.05 part by weight of calcium per 100 parts by weight of $P_2O_5$.

EXAMPLE II

The following example illustrates the relatively high extraction efficiency of a preferred liquid hydrocarbon-low molecular weight alcohol mixture of the present invention as compared with the extraction efficiency of a low molecular weight alcohol per se. The preferred organic liquid extractant in this example is composed of n-heptane and isobutyl alcohol.

Data for this example are obtained by equilibrating, at 50° C., 20 parts by volume of the organic liquid extractant with 400 parts by volume of aqueous acidulate prepared essentially as in Example I and adjusted to contain 100 grams per liter of $P_2O_5$ and 109 grams per liter of calcium. The composition of the organic phase at equilibrium is indicated in Table I.

TABLE I

Composition of Organic Phase in Equilibrium with Aqueous Acidulate at 50°C.

| Organic Liquid Extractant | Composition of Organic Phase | | |
|---|---|---|---|
| | $P_2O_5$ (grams/liter) | Calcium (grams/liter) | $P_2O_5$/Calcium |
| Isobutyl Alcohol | 43 | 1.30 | 33 |
| 8:1 vol. ratio isobutyl alcohol: heptane | 38 | 0.68 | 56 |
| 4:1 vol. ratio isobutyl alcohol: heptane | 31 | 0.38 | 82 |

The results summarized in Table I show that the weight ratio of $P_2O_5$ to calcium increases with increasing proportion of liquid hydrocarbon in the organic liquid extractant notwithstanding the corresponding small decrease in $P_2O_5$ concentration in the organic phase. This improvement becomes still greater using multistage extraction techniques as illustrated in Example I.

EXAMPLE III

In accordance with the preferred process, the overall extraction of phosphoric acid from acidulate involves three integrated extraction sections, which for convenience may be called extraction, purification, and recovery sections. Briefly stated, the extraction section embodies multistage countercurrent extraction of the aqueous acidulate with the organic liquid extractant to form an organic solution of phosphoric acid containing small amounts of calcium. The purification section entails multistage countercurrent extraction of the organic solution of phosphoric acid with aqueous phosphoric acid to extract calcium into the aqueous phase and form an organic solution of phosphoric acid containing less than 0.5 part by weight of calcium per 100 parts by weight of phosphoric acid, measured as $P_2O_5$. The recovery section involves multistage countercurrent extraction of the purified organic solution of phosphoric acid with water to form a relatively pure aqueous solution of phosphoric acid. Each section of the overall extraction has been studied individually to ascertain criticality of process conditions. Operation of the entire extraction process as an integrated unit has also been studied. Results are reported below.

EXTRACTION SECTION

Tests are carried out in a multistage countercurrent rocking funnel extractor using a solvent to acidulate volume ratio of 5/1. The solvent is a solution of four volumes of isobutyl alcohol and one volume of heptane, said solution being saturated with water. The acidulate is prepared in accordance with the procedure of Example I and contains about 125–135 grams $P_2O_5$ per liter. About one volume of 37 percent aqueous HCl per four volumes of acidulate is added near the solvent feed stage to improve extraction of phosphoric acid and avoid precipitation of solids during the extraction.

It is found that about 95 percent of the phosphoric acid is extracted from the acidulate into the organic phase in four to five stages, and over 99 percent of the phosphoric acid is extracted in nine stages. The aqueous HCl must be added at or near the raffinate removal stage rather than at the same stage in which the acidulate is fed to the extraction system. By so doing, the HCl can be maintained at a sufficiently high level throughout the extraction section to prevent precipitation. Extraction of phosphoric acid is relatively poor if the solvent to acidulate volume ratio is reduced to less than 3/1.

PURIFICATION SECTION

Phosphoric acid and calcium are not completely separated in the extraction section. For example, the organic solution of phosphoric acid from the extraction section can contain up to about 5 parts by weight of calcium per 100 parts by weight of phosphoric acid. This ratio is greatly decreased by extraction of the calcium from the solvent with aqueous phosphoric acid relatively low in calcium. A portion of the purified phosphoric acid produced in the overall extraction operation is desirably used as extractant. This aqueous phosphoric acid typically contains about 80 to 140 grams $P_2O_5$ per liter and has less than 0.5 parts by weight of calcium per 100 parts by weight of phosphoric acid, measured as $P_2O_5$.

Tests are carried out passing 30 parts by volume of aqueous phosphoric acid product containing about 90 grams $P_2O_5$ per liter and having a $P_2O_5$:Ca weight ratio of 200 countercurrent to 200 parts by volume of organic extract from the extraction section, said organic extract initially having a $P_2O_5$:Ca weight ratio of 20. Use of nine purification extraction stages gave an organic extract having a $P_2O_5$:Ca weight ratio of 440; however, two to three stages are adequate to reduce the calcium in the organic phase to less than 0.5 part by weight of calcium per 100 parts by weight phosphoric acid, measured as $P_2O_5$.

For the purification stages to fulfill their purpose, there must be sufficient aqueous phase being returned countercurrent to the organic phase, and a sufficient number of stages. A volume ratio of aqueous phase to organic phase of between about one-fifth and about one-seventh is desirable, and two to three purification stages are preferred. In terms of recycle of product acid, the minimum ratio of product acid recycle to net product acid is about 0.77 to 1.

RECOVERY SECTION

Phosphoric acid is recovered from the organic solvent solution from the purification section by being reextracted into an aqueous phase by countercurrent contact with water. A volume ratio of organic phase to water of about 3/1 to 5/1 gives satisfactory recovery; e.g., about 98 percent recovery of phosphoric acid from the organic phase is obtained in 10–11 stages with an organic phase initially containing 38 grams $P_2O_5$ per liter. The highest practical concentration of $P_2O_5$ in the aqueous phase is about 175 grams $P_2O_5$ per liter, about 80–140 grams $P_2O_5$ per liter being typical, with use of seven to 14 washing stages.

Volume changes in the phases are appreciable, particularly in the purification and recovery sections. In the purification section, up to 80 percent of the aqueous phase has been observed to dissolve in the organic phase, this aqueous phase being released in the recovery section. Therefore, for convenience, ratios of the phases are expressed in terms of feeds to the sections.

Although addition of hydrogen chloride improves extraction of phosphoric acid from acidulate, hydrogen chloride makes recovery of phosphoric acid from the organic extract more difficult in the recovery section. For this reason, addition of hydrogen chloride to the extraction section should be kept near the minimum that will avoid precipitation of solids in the system. The weight ratio of hydrogen chloride added to the acidulate to the $P_2O_5$ present therein is preferably about 0.9.

A major problem in prior extraction studies was that of silica precipitating in the recovery section and either giving emulsions or plugging the extractor. This problem has been overcome by removing silica from the acidulate by adding sodium chloride to the reaction of phosphate rock with hydrochloric acid.

COMPLETE EXTRACTION PROCESS

The three sections of the complete extraction process, i.e., extraction section, purification section and recovery section, are integrated into a single system, and performance data are obtained using three solvents: isobutyl alcohol-heptane, isobutyl alcohol-kerosene, and crude isobutyl alcohol-heptane, the crude isobutyl alcohol containing about 10 percent by weight of lower alcohols including isopropyl alcohol, ethanol and methanol. In one preferred complete extraction system, the extraction section consists of about 15–16 stages; the purification section consists of two to three stages; and the recovery section consists of about seven to 10 stages. The organic solvent mixture contains 4 volumes of alcohol per 1 volume of hydrocarbon. The acidulate is prepared in accordance with the procedure of Example I and contains 135 grams $P_2O_5$ per liter. The acidulate is extracted with about 3–5 parts by volume of the organic solvent.

Heptane and kerosene are compared as additives to isobutyl alcohol. Kerosene is not as satisfactory as heptane in the mixed solvent. For example, at each stage in the extraction section, the $P_2O_5$ concentration in the organic phase is about 14 percent higher in tests using the isobutyl alcohol-heptane than with the isobutyl alcohol-kerosene solvent. Also, in the recovery section kerosene causes separation into three liquid phases in 5 stages including the product removal stage. The appearance of three liquid phases is considered undesirable in commercial operation.

The crude isobutyl alcohol-heptane mixture is slightly less effective than the relatively pure isobutyl alcohol-heptane mixture with respect to separation of calcium from the phosphoric acid. Solvent loss is about 10.0 percent with use of the crude isobutyl alcohol, probably due to the relatively water-soluble alcohols present in the system.

With use of the relatively pure isobutyl alcohol-heptane as solvent, weight ratios of $P_2O_5$:Ca greater than 200:1 are easily attained in the product phosphoric acid.

In similar experiments a number of $C_2$ to $C_6$ alcohols and their mixtures with hexane, heptane and toluene are tested as solvents. Mixtures containing butyl alcohols and heptane or hexane give the best balance between effective separation of calcium and efficient extraction of phosphoric acid. Using mixtures of isobutyl alcohol and heptane or hexane, improved separation of $P_2O_5$ and calcium results at elevated temperatures of 50° C. or above, but more favorable extraction of phosphoric acid from the acidulate is attained at 25°–50 C., particularly at ambient temperatures of about 25° C.

The foregoing examples are presented for the purpose of illustrating the novel process of the present invention. It is, of course, understood that variations in the procedures described in those examples as well as changes in the materials used therein can be made without departing from the scope of the invention. Other advantages over the prior art, not disclosed herein may also exist for this invention which is defined in the following claims.

What is claimed is:

1. A process for the production of phosphoric acid low in calcium chloride content, comprising:
   a. reacting phosphate rock with a reactive excess of hydrochloric acid in the presence of 3 to 10 parts by weight of sodium chloride per 100 parts by weight of phosphate rock to produce an aqueous acidulate containing phosphoric acid, calcium chloride, and insoluble siliceous material;
   b. separating the insoluble siliceous material from the aqueous acidulate to form a clear aqueous acidulate containing phosphoric acid, calcium chloride and no more than 0.1 percent by weight of dissolved siliceous material, expressed as $SiO_2$, said clear aqueous acidulate containing 125–135 grams $P_2O_5$ per liter;
   c. extracting the clear aqueous acidulate with 3–5 parts by volume per part of acidulate, of a homogeneous, water-immiscible organic liquid extractant containing about 75 to 85 percent by volume of isobutyl alcohol and about 25 to 15 percent by volume of heptane, said extraction being conducted as a multistage countercurrent extraction of about nine to 16 stages at a temperature between about 25° C. and about 80° C., said extraction further being conducted in the presence of at least about 0.9 part by weight of added hydrochloric acid per part by weight of $P_2O_5$ in the acidulate feed, said hydrochloric acid being added at the organic liquid feed end of said multistage countercurrent extraction, to produce an organic solution of phosphoric acid containing hydrochloric acid and about 1–6 parts by weight of calcium per 100 parts by weight of phosphoric acid, measured as $P_2O_5$:
   d. extracting the organic solution formed in step (c) with one-fifth to one-seventh part by volume per part of organic solution, of aqueous phosphoric acid recycled from step (f), said extraction being conducted as a multistage countercurrent extraction of two to nine stages at a temperature between about 25° and 80° C., to extract calcium from the organic solution and produce an organic solution of phosphoric acid containing hydrochloric acid and about 0.05 part by weight of calcium per 100 parts by weight of phosphoric acid, measured as $P_2O_5$, and an aqueous phosphoric acid solution containing extracted calcium;
   e. recycling the aqueous phosphoric acid solution formed in step (d) to step (c) for recovery of the phosphoric acid by multistage countercurrent extraction with the organic liquid extractant;
   f. extracting the organic solution formed in step (d) with about one-third to one-fifth part of water by volume per part of organic solution, said extraction being conducted as a multistage extraction of about seven to 14 stages at a temperature between about 25° and 80° C. to produce an aqueous solution of phosphoric acid containing hydrochloric acid and about 0.05 part by weight of calcium per 100 parts by weight phosphoric acid, measured as $P_2O_5$;
   g. recycling part of the aqueous solution of phosphoric acid formed in step (f) to step (d), the amount of said acid recycled being at least 0.77 part per part of residual aqueous solution of phosphoric acid; and
   h. concentrating the residual aqueous solution of phosphoric acid from step (f) by evaporation to remove the hydrogen chloride and part of the water to form a concentrated aqueous phosphoric acid containing about 0.05 part by weight of calcium per 100 parts by weight phosphoric acid, measured as $P_2O_5$.

* * * * *